United States Patent
Desai et al.

(10) Patent No.: US 8,617,673 B1
(45) Date of Patent: Dec. 31, 2013

(54) THERMOFORMABLE HEAT-SEALABLE PET SHEET MATERIAL

(75) Inventors: Nirav N. Desai, Madison, WI (US); Lewis Daniel Lee, Evansville, WI (US)

(73) Assignee: Placon Corporation, Madison, WI (US)

( * ) Notice: Subject to any disclaimer, the term of this patent is extended or adjusted under 35 U.S.C. 154(b) by 128 days.

(21) Appl. No.: 12/961,325

(22) Filed: Dec. 6, 2010

Related U.S. Application Data

(62) Division of application No. 12/252,339, filed on Oct. 15, 2008.

(60) Provisional application No. 60/992,597, filed on Dec. 5, 2007, provisional application No. 60/987,319, filed on Nov. 12, 2007.

(51) Int. Cl.
| | |
|---|---|
| *B32B 27/06* | (2006.01) |
| *B32B 27/08* | (2006.01) |
| *B32B 27/36* | (2006.01) |
| *B32B 7/04* | (2006.01) |
| *B32B 7/10* | (2006.01) |
| *B65D 6/00* | (2006.01) |
| *B65D 6/28* | (2006.01) |
| *B65D 8/00* | (2006.01) |
| *B65D 8/18* | (2006.01) |

(52) U.S. Cl.
USPC ......... 428/35.7; 428/34.1; 428/343; 428/346; 428/347; 428/349; 428/480

(58) Field of Classification Search
None
See application file for complete search history.

(56) References Cited

U.S. PATENT DOCUMENTS

| | | | |
|---|---|---|---|
| 4,381,337 A | | 4/1983 | Chang |
| 4,498,588 A | * | 2/1985 | Scott .............................. 206/526 |
| 4,637,514 A | * | 1/1987 | Kildea et al. .................... 225/49 |
| 4,913,307 A | | 4/1990 | Takata et al. |
| 5,106,567 A | * | 4/1992 | Demerest ...................... 264/503 |
| 5,219,086 A | * | 6/1993 | Bjorck .......................... 220/270 |
| 5,236,749 A | * | 8/1993 | Ewing .......................... 428/35.2 |
| 5,300,748 A | * | 4/1994 | Colombo ...................... 219/734 |
| 5,500,261 A | | 3/1996 | Takei et al. |
| 5,503,790 A | * | 4/1996 | Clements .................... 264/176.1 |
| 5,506,046 A | * | 4/1996 | Andersen et al. ............ 428/34.5 |
| 5,614,145 A | * | 3/1997 | O'Kane ......................... 264/458 |
| 5,693,278 A | * | 12/1997 | Clements .................. 264/176.1 |
| 5,695,710 A | | 12/1997 | Chen, Sr. et al. |
| 5,744,578 A | * | 4/1998 | Duh .............................. 528/492 |
| 5,843,501 A | * | 12/1998 | Rubin et al. .................. 426/127 |
| 5,912,307 A | * | 6/1999 | Paschke et al. ............... 525/444 |
| 5,914,191 A | * | 6/1999 | Hanson et al. ................ 428/409 |
| 5,948,525 A | * | 9/1999 | Kimura et al. ................ 428/339 |
| 5,955,181 A | * | 9/1999 | Peiffer et al. ................. 428/212 |
| 6,187,422 B1 | * | 2/2001 | Murschall et al. ............ 428/220 |

(Continued)

FOREIGN PATENT DOCUMENTS

JP 2003-011947 * 1/2003

*Primary Examiner* — Vivian Chen
(74) *Attorney, Agent, or Firm* — Stiennon & Stiennon

(57) ABSTRACT

A sheet for thermoforming is comprised of a material which is compatible with PET and which has slower crystallinity and a crystallization temperature which is at least 77° C. greater than its glass transition temperature, more preferably a crystallization temperature greater than 151° C. The material may be coextruded into a sheet with a first PET material, such that when thermoformed into a formed part the layers of second material are engaged with each other in the molded parts and for being subjected to heat sealing.

8 Claims, 5 Drawing Sheets

(56) References Cited

U.S. PATENT DOCUMENTS

| | | |
|---|---|---|
| 6,277,474 B1 * | 8/2001 | Murschall et al. .......... 428/195.1 |
| 6,429,243 B1 * | 8/2002 | Okamoto et al. ............. 524/127 |
| 6,472,472 B2 | 10/2002 | Jung et al. |
| 6,586,558 B2 | 7/2003 | Schmidt et al. |
| 6,610,378 B1 * | 8/2003 | Kimura et al. ............... 428/35.8 |
| 6,616,998 B2 | 9/2003 | Greer et al. |
| 6,663,977 B2 * | 12/2003 | Kurian et al. ................. 428/480 |
| 6,706,399 B1 | 3/2004 | George et al. |
| 6,749,785 B2 * | 6/2004 | Subramanian et al. .. 264/173.16 |
| 6,855,778 B2 * | 2/2005 | Yanuzzi et al. ................ 525/444 |
| 6,902,802 B2 * | 6/2005 | Kurian et al. ................. 428/349 |
| 6,939,584 B2 * | 9/2005 | Sankey et al. ............. 427/393.5 |
| 6,986,864 B2 * | 1/2006 | Porter ........................... 264/544 |
| 7,063,889 B2 * | 6/2006 | Yoshida et al. ............... 428/327 |
| 7,198,856 B2 * | 4/2007 | Yamanaka et al. ........... 428/458 |
| 7,243,815 B2 * | 7/2007 | Coppedge et al. ............ 220/769 |
| 7,358,324 B2 * | 4/2008 | Chen et al. .................... 528/288 |
| 7,569,276 B2 * | 8/2009 | Kendig et al. .............. 428/423.7 |
| 7,632,370 B2 * | 12/2009 | van Driesten ................ 156/152 |
| 2002/0197427 A1 | 12/2002 | Wu et al. |

* cited by examiner

THERMOFORMABLE HEAT-SEALABLE PET SHEET MATERIAL

CROSS REFERENCES TO RELATED APPLICATIONS

This application is a divisional application of U.S. application Ser. No. 12/252,339, filed Oct. 15, 2008, the disclosure of which is incorporated by reference herein, and claims the benefit of U.S. provisional App. No. 60/987,319, filed Nov. 12, 2007; and U.S. provisional App. No. 60/992,597, filed Dec. 5, 2007; the disclosures of which are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to sheet material for thermoforming containers in general, and more particularly to sheet materials which are suitable for recycling.

Polyethylene terephthalate (PET) is a plastic resin widely used in consumer products and containers, such as in many disposable beverage containers. PET plastic offers the desirable property of being readily recyclable. Systems are in place in many regions of the world to collect, aggregate, and transport the used PET material objects and to submit them to processors for conversion into flakes for reuse in other applications. This recycled PET (RPET), can then be extruded into sheet form or otherwise formed into other objects, reducing the quantities of plastic waste committed to incineration or landfills. PET is well suited to being prepared in a transparent or amorphous form, and may readily be molded into a desired shape through conventional molding techniques such as thermoforming.

Prior to the development of widespread and accessible plastic recycling systems, other plastic materials were frequently used in consumer products and containers, among them Polyvinyl chloride (PVC) plastic. PVC plastic is also readily thermoformed into desired shapes, and is also adaptable to forming sealed containers by using a variety of heat sealing techniques to cause thin sheets of like PVC plastic to be welded together to thereby form a tamper-resistant seal. Yet recycling techniques for PVC plastic are not as advanced as those for PET plastic, and can be costly. As a result, in many applications there is a desire to substitute PET plastic materials where once PVC plastic had been used. There are many advantages to using a recognized environmentally friendly material such as PET.

Many retail containers are fabricated of transparent sheet material which permits the merchandised contents to be directly viewable by the consumer. To prevent pilferage, products, especially small and valuable items, may be enclosed in larger plastic containers which have sealed margins which may only be opened by a sharp implement or shears. This sealing is usually brought about at the point of filling the container with product by subjecting the overlapping flanges of a clam-shell or two-part container to any of a number of heat-sealing processes. These processes include radio frequency heat sealing, ultrasonic heat sealing, bar heat sealing, and UV sealing. The equipment to carry out these processes is well known in the art, and has been employed in many installations for years, and has been acquired often at great cost. Some of these processes, while providing exemplary service in joining PVC materials, function very poorly with conventional PET materials.

There are two types of joints or connections between plastic elements which in common language are referred to as heat seals, yet which are of a radically different nature. The first is of a primarily temporary nature, and may be referred to as a peelable seal. In a peelable seal two plastic elements are joined by being heated, but the bond between the two elements is weak. As a result, when the bond is subjected to pulling forces the bond between the two elements will fail well before the failure of the underlying plastic. The second type of bond, also sometimes referred to as a heat seal, is of a more permanent nature, and will be referred to herein as a "weld". In a welded heat seal, the two plastic elements are so securely joined to one another that when subjected to a pulling test, the plastic elements will themselves fail before the bond separates. For example, the ASTM D638-03 Standard Test Method for Tensile Properties of Plastics may be used to determine whether a successful weld has been formed. For retail containers intended to restrict pilferage, a welded heat seal is desirable.

Unfortunately, a weld between sheets of conventional PET material is difficult to form by heat sealing. Although PET is naturally a crystalline resin, it can be made into an amorphous, and hence transparent, material. Crystalline PET (CPET) is opaque. As the amorphous PET is heated above its crystallization temperature, it will return to a crystalline state, and will lose its transparency. Moreover, the material in this state will fail to form a suitable welded bond. The difficulty in forming a heat-seal weld between two PET sheets is this: In order to form a good weld, the plastic material must be heated above its glass transition temperature, but if the materials are heated too much they will become crystalline, and therefore incapable of properly bonding; yet the difference between the glass transition temperature and the crystallization temperature of conventional PET materials may be far too narrow an operating window for many conventional heat sealing processes.

PET may be modified by copolymerization to produce amorphous copolyesters such as PETG, available from EastmanChemical and SKchemicals. With amorphous copolyesters, the "operating window" of temperatures is expanded, and repeatable welding becomes more readily obtainable. PETG gives very good heat sealing performance. However, PETG is much more expensive than PET. Different resins may be combined into a single sheet of plastic material through the coextrusion process, in which two materials are simultaneously extruded to form a single sheet with distinct layers in intimate contact with one another. Although a lower-cost composite sheet might be formed with a thin layer of the more costly PETG coextruded with PET or RPET, the PETG is different enough from PET that it makes recycling difficult. For example, the glycol component of PETG can make recycling difficult. Hence where recycling of materials is desired PET and PETG should not be mixed.

What is needed is a sheet material for PET plastic container which can be economically fabricated and heat sealed to provide pilferage resistant seals, which is recyclable, and which is also readily used in connection with existing heat-sealing equipment designed for use with PVC materials.

SUMMARY OF THE INVENTION

The sheet material of this invention may be formed into a container. The sheet is comprised of a material which is compatible with PET and which has a slower crystallinity, and a crystallization temperature which is at least about 77° C. greater than its glass transition temperature. The sheet may include a layer of PET or RPET. The sheet when thermoformed into parts will allow heat sealing using conventional heat sealing equipment such as employed for welding PVC material parts.

It is a still further object of the present invention to provide a sheet of readily thermoformable and heat-sealable material which may be recycled with PET material.

Further objects, features and advantages of the invention will be apparent from the following detailed description when taken in conjunction with the accompanying drawings.

DESCRIPTION OF THE PREFERRED EMBODIMENTS

Figure 1:
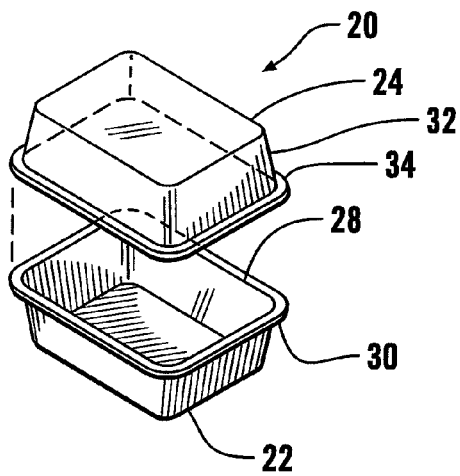
FIG. 1 is an exploded isometric view of a container of the present invention.

Referring more particularly to FIGS. 1-11, wherein like numbers refer to similar parts, a container 20 of the present invention is shown in FIG. 1. The container 20 has a base 22 which mates with a lid 24. The base 22 and lid 24 are welded together to form a pilferage-resistant compaitinent 26. Although shown as a generally prismatic shape, it should be note that the general shape of the container may take on many different forms to best suit the contents of the container.

Figure 2:
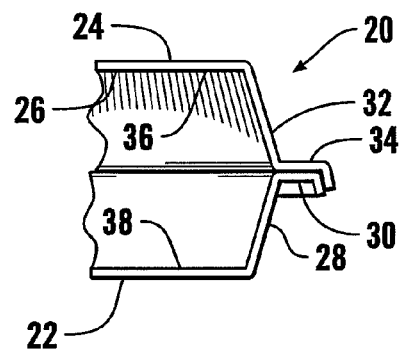
FIG. 2 is a fragmentary cross-sectional view of the container of FIG. 1.
Figure 3:
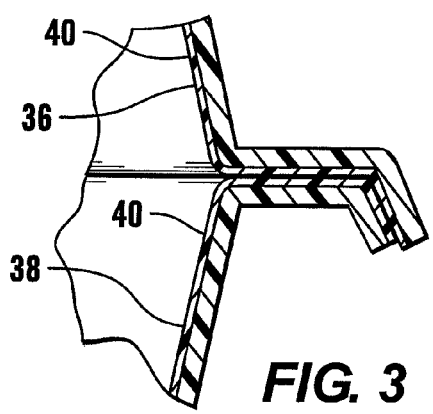
FIG. 3 is an enlarged schematic view of a fragment of the container of FIG. 2, indicating the layers of the coextruded sheets from which the container is fabricated.

As shown in FIGS. 2 and 3, the container 20 base 22 has an upwardly extending side wall 28 which has an outwardly protruding base flange 30. The lid 24 has a downwardly extending side wall 32 with an outwardly protruding lid flange 34. The base flange 30 and the lid flange 34 extend generally in the same plane, so that the downwardly facing surface 36 of the lid 24 and the upwardly facing surface 38 of the base 22 may be brought into engagement at the overlapping flanges. Although the base 22 and lid 24 have been illustrated as distinct molded components, it should be noted that the base and lid may be connected by an integral hinge, as discussed below with respect to FIG. 5. The base and lid flanges are brought into contact with each other after the container compartment has been filled, and are then heat sealed to one another to define a peripheral weld which prevents ready separation of the two halves of the container.

The base 22 and lid 24 may be produced through conventional thermoforming techniques, in which a plastic sheet or web is heated and brought into contact with a mold on which vacuum is drawn. Thus the starting material for the base 22 and lid 24 is a planar thin sheet of plastic, generally between 0.012 and 0.050 inches thick. The sheet is preferably a transparent material.

Figure 6:
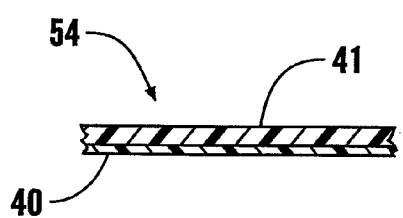
FIG. 6 is a fragmentary cross-sectional view of a sheet of a coextruded sheet of material suitable for forming through a thermoforming process.

The range between the glass transition temperature and the crystallization temperature of a plastic material is the operating window for the heat sealing operation. The plastic stock sheet material 54, as shown in FIG. 6, from which the base and lid are fabricated preferably comprises a primary resin which is amorphous PET or amorphous RPET plastic, coextruded with a secondary resin which has a suitably large operating window. A preferred secondary resin, which has an operating window of about 85 degrees C. is the Futura Polyesters Limited resin Type No. 940411, available from Futura Polyesters Limited; 1, Kamarajar Salai, Manali, Chennai-600 068, India. This material has slower crystallinity, an elevated crystallization temperature and a lowered melting temperature of about 228 degrees C., and a glass transition temperature of about 68 degrees, and a crystallization temperature of about 153 degrees C. Slower crystallinity means that if exposed to heat, it will not become readily crystallized. The secondary resin is a PET resin, making it not only compatible with PET, allowing it to be coextruded into sheets, but allowing it to be recycled with PET without appreciably degrading the quality of the PET as it becomes RPET.

Figure 8:
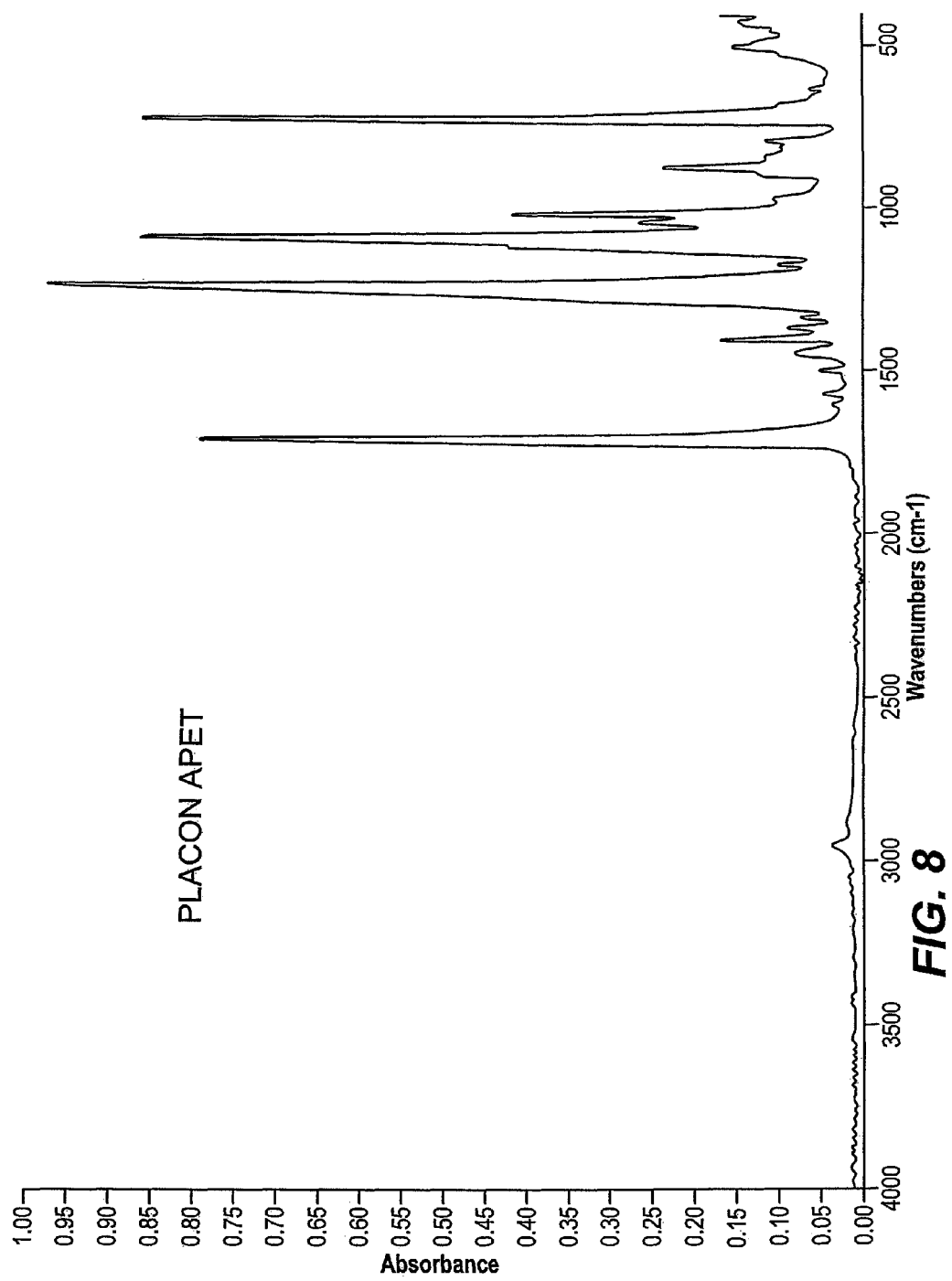
FIG. 8 is a graph of the results of a Fourier Transform Infrared Analysis (FTIR) a conventional amorphous PET resin.

FIG. 8 is a graph of the results of a Fourier Transform Infrared Analysis (FTIR) conducted according to the test method of ASTM E1252-98 using a Thermo Nicolet Avatar 360 FTIR Spectrometer of a conventional amorphous PET resin used by Placon Corporation, Madison, Wis.

Figure 9:
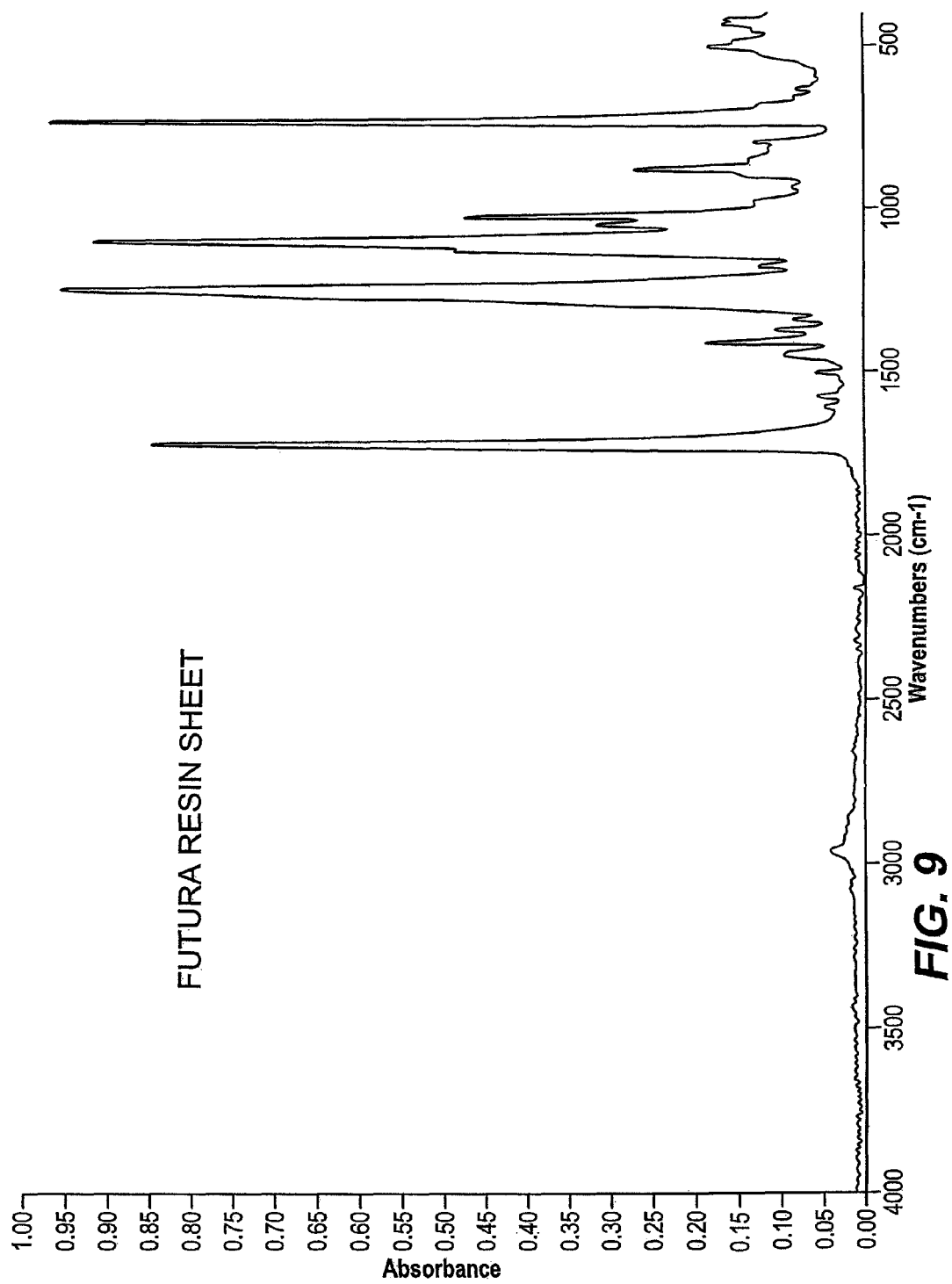
FIG. 9 is a graph of the results of a Fourier Transform Infrared Analysis (FTIR) of a sheet of Futura Polyesters Limited resin Type No. 940411.

FIG. 9 is a graph of the results of a Fourier Transform Infrared Analysis (FTIR) conducted according to the test method of ASTM E1252-98 using a Thermo Nicolet Avatar 360 FTIR Spectrometer of a Futura Polyesters Limited resin Type No. 940411 sheet.

Figure 10:
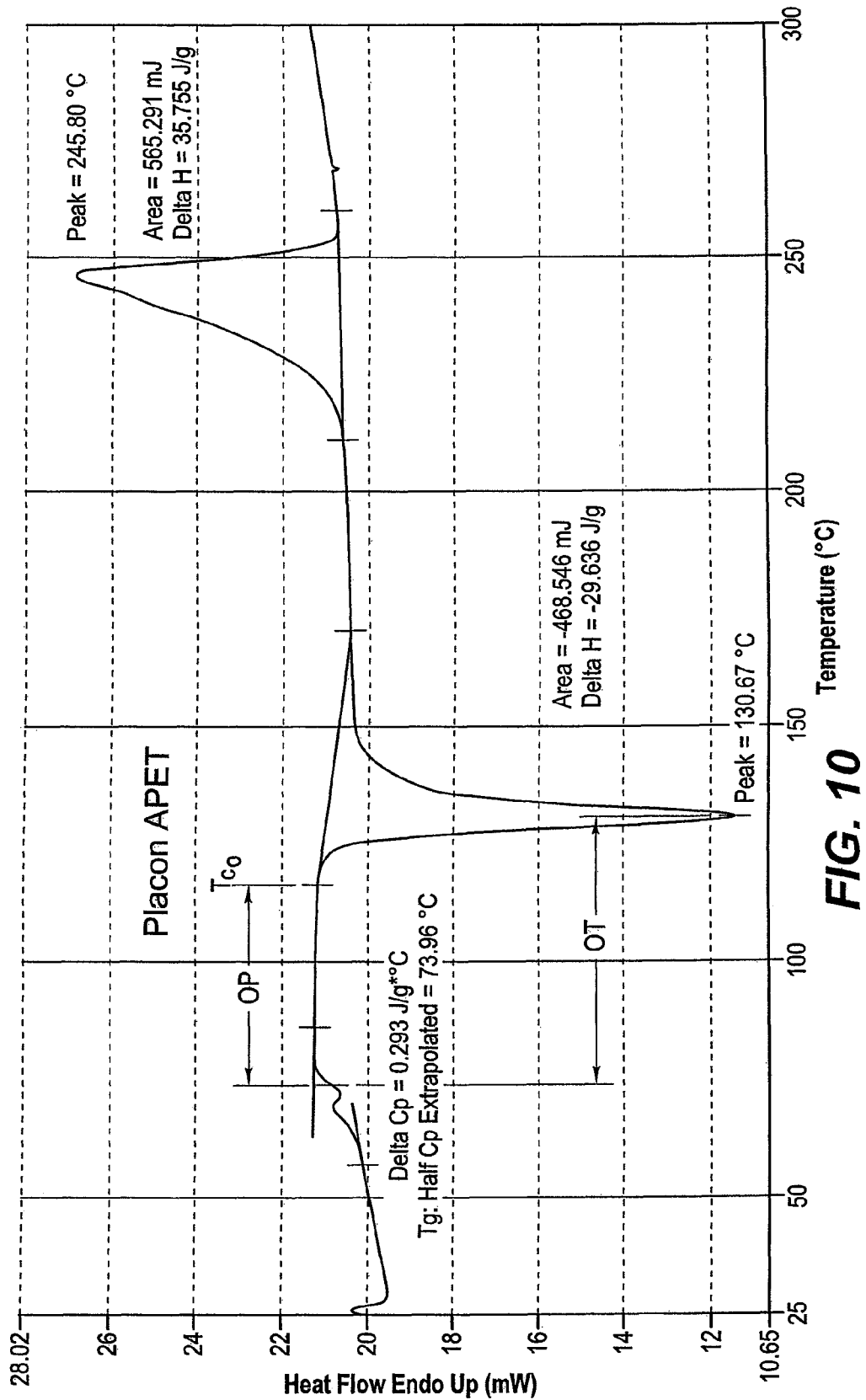
FIG. 10 is a graph of the results of a Differential Scanning calorimetry (DSC) test of the same PET resin of FIG. 8.

FIG. 10 is a graph of the results of a Differential Scanning calorimetry (DSC) test of a conventional amorphous PET resin used by Placon Corporation, Madison, Wis., conducted according to the test method of ASTM D 3418-03, E 793-06, E 967-03, E 1356-03, using a Perkin Elmer DSC-7, with a sample holder of Platinum/Iridium Alloy—0.325" Round, at a testing rate of 10° C. Per Minute; calibration AH of Indium and M.P. of Indium and Zinc; atmosphere Nitrogen—99.998%—Dried—25 ml/min.

Figure 11:
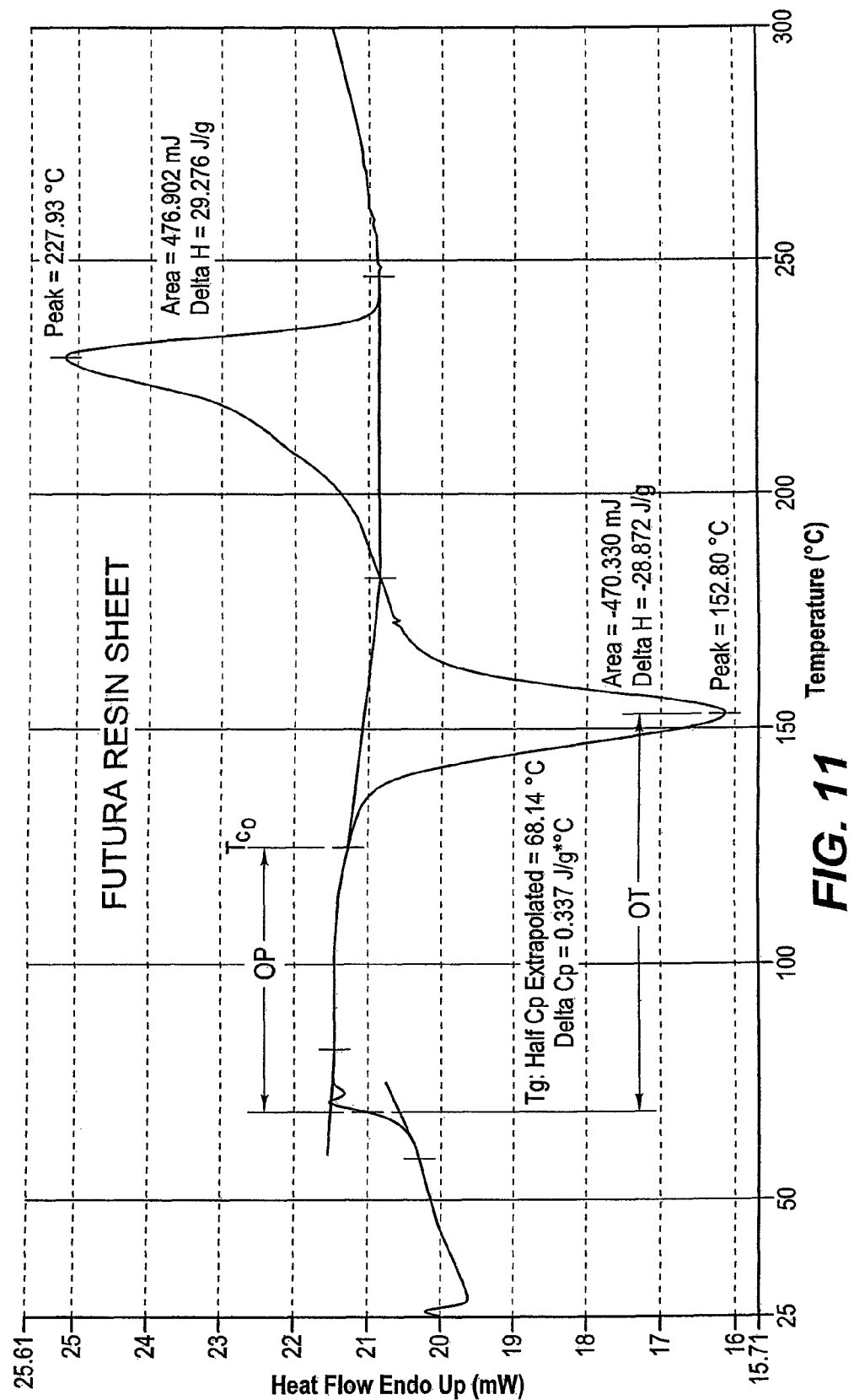
FIG. 11 is a graph of the results of a Differential Scanning calorimetry (DSC) test of a sheet of Futura Polyesters Limited resin Type No. 940411 PET.

FIG. 11 is a graph of the results of a Differential Scanning calorimetry (DSC) test of a sheet of Futura Polyesters Limited resin Type No. 940411, conducted according to the test method of ASTM D 3418-03, E 793-06, E 967-03, E 1356-03, using a Perkin Elmer DSC-7, with a sample holder of Platinum/Iridium Alloy—0.325" Round, at a testing rate of 10° C. Per Minute; calibration AH of Indium and M.P. of Indium and Zinc; atmosphere Nitrogen—99.998%—Dried—25 ml/min.

The results of the DSC tests of sheets of Futura Polyesters Limited resin Type No. 940411 and Placon's APET resin are summarized in Table I.

TABLE I

| Sample Name | Tg °C. | Peak Tc °C. | ΔHc J/g | Peak Tm °C. | ΔHm J/g |
|---|---|---|---|---|---|
| Futura Polyesters Limited resin Type No. 940411 | 68 | 153 | −28.9 | 228 | 29.3 |
| Placon APET | 74 | 131 | −29.6 | 246 | 35.8 |

In Table I,
Tg = Glass Transition Temperature = The temperature at which an amorphous polymer or the amorphous part of a crystalline polymer goes from a hard, brittle state to a soft, rubbery state.
Tm is the temperature at which a crystalline polymer melts.
Tc is the temperature at which a crystalline polymer crystallizes.
ΔHm is the amount of energy a sample absorbs while melting.
ΔHc is the amount of energy a sample emits while crystallizing Referring to FIGS. 10 and 11, it will be observed that there is a range OP on the DSC graphs between the glass transition Temperature Tg and the initial crystallization temperature $Tc_0$, where the material softens without crystallizing. This region OP in the DSC graph of the conventional PET resin is about 43° C., whereas in the DSC graph of a test of Futura resin sheet, the region OP is substantially larger: about 52° C. Even more dramatically, the range OT from the glass transition temperature to the crystallization temperature is about 57° C. for the conventional PET material, and about 85° C. for the Futura resin. By using a resin with this increased range, conventional heat sealing equipment is much more readily employed. Preferably the material selected will have a range OT which is at least 20° C. greater than conventional PET, i.e., greater than 77° C. More preferably, the crystallization temperature of the selected PET resin should be higher than for conventional amorphous PET, preferably more than 20° C. greater, i.e, greater than about 151° C.

Figure 7:
FIG. 7 is a fragmentary cross-sectional view of a sheet of material formed as a monolayer suitable for forming through a thermoforming process.

Even within the manufacturing environment of thermoformed containers, there is a significant quantity of manufacturing waste, resulting from trim, start-up, discards, etc. Thus it is advantageous to be able to recycle this pre-consumer waste even within the production environment. It should be noted that the sheet, although preferably formed as a coextruded element as described, having a primary resin layer 41 and a secondary resin layer 40, may also be provided as a monolayer sheet 56 of the secondary resin, as shown in FIG. 7.

The larger operating window for heat sealing is desirable because, in a working factory operating environment, there are many variables which can affect the temperature of the plastic being heat sealed, including environmental conditions, power supply variations, equipment variations, etc. If the operating window is too small, the formation of a successful weld becomes a delicate operation which must be closely monitored. A wider operating window permits of successful operation despite minor variations in operating conditions, and hence greater quality overall.

The PET primary resin comprises about 70 percent by weight of the coextruded sheet, and the secondary resin comprises preferably about 10 to 40, more preferably 20-30 percent by weight, with the thicknesses of each layer being proportional. As shown in FIG. 3, the secondary resin layer 40 is shown on both the lid part and the base part. After the plastic sheet has been formed into the lid 24 and the base 22, the lid flange 34 and the base flange 30 are brought together at a heat sealing station, and any of various heat sealing operations may be carried out to form a weld between the flanges. The heat sealing operation may be radio frequency heat sealing, ultrasonic heat sealing, bar heat sealing, or UV sealing.

After the sealing operation, portions of the flanges are welded together in such a fashion that when subjected to a pull test, the unwelded plastic will generally fail prior to the failure of the weld between the two plastic parts. The coextruded sheets offer cost savings over competing plastics, while being recyclable with PET materials and heat sealable by conventional PVC heat sealing equipment. The secondary material layer in the coextruded sheet 54 preferably has a thickness of at least 4/1000 inches. The coextruded sheet 54 preferably has an intrinsic viscosity of 0.67 or higher. The coextruded sheet 54 is also very clear, preferably having a clarity of greater than 93 percent, and a haze of less than 10 percent, as determined using ASTM specification D1003.

Figure 4:
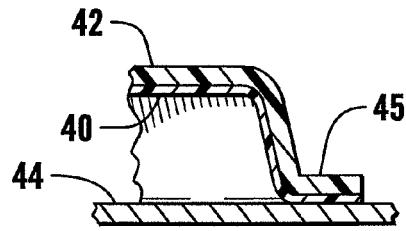
FIG. 4 is a fragmentary cross-sectional view of a blister package of this invention having a plastic blister heat-sealed to a stiff paperboard card.

As shown in FIG. 4, the coextruded sheet 54 having a primary resin and a secondary resin as discussed in the package of FIG. 1, may be used in a blister card package comprised of a thermoformed thermoplastic blister 42 which is heat sealed to a stiff substrate 44 such as a paperboard card. The card 44 will usually be printed upon, and then coated with an aqueous or solvent-based adhesive. The blister 42 has a peripheral flange 45 which is heat sealed to the card after the blister has been filled with product. The heat seal is such that a removal of the blister from the card will result in 100 percent fiber tear, giving evidence of tampering. It should be noted that the substrate might be selected to be heat sealable with a peelable or welded seal. The substrate may be formed of a variety of sheet materials, such as paperboard, duPont TYVEK® flashspun high-density polyethylene fiber material, sheets of plastic as well as other materials commonly sealed to PETG plastic including laminates and foils. Although the material is preferably transparent, coloring may be added. As described above with respect to the two-part thermoformed container, the blister 42 may be formed of sheet material 56 formed of a monolayer of the secondary resin.

Figure 5:
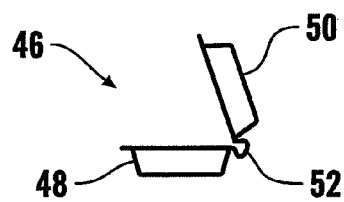
FIG. 5 is a side elevational view of a clamshell container of this invention.

As shown in FIG. 5, the container 46 may be formed as a clam shell, having a base 48 which is joined to a lid 50 with an integral hinge 52, allowing the lid to be pivoted about the hinge and closed on the base after the base has been filled with product.

It should be noted that the Futura resin when coextruded with RPET may provide a desirable barrier of virgin plastic material overlying the recycled component which can act to separate RPET material from any product which is to be packaged within the container.

It should be noted that only one of the parts of the container needs be formed of the coextruded sheet having a layer of the Futura material described above, alternatively the second thermoformed part may be formed of a plastic material selected from the group consisting of PET, RPET, PETG, or PVC, wherein the second layer of the Futura material first part is welded to the second thermoformed part.

It should be noted that the coextruded plastic sheet may be formed with an ABA structure, with PET or RPET layer positioned between outer layers of Futura resin. In such an arrangement each Futura layer would be 10-25 percent by weight of the total weight of the coextruded sheet.

It should be noted that the coextruded sheet material or monolayer sheet material may be supplied for further thermoforming, for example in form, fill, seal applications, as either roll stock or cut sheet stock. Preferably the sheet material will have a minimum thickness of 0.007 inches and be up to 0.050 inches maximum thickness.

It is understood that the invention is not limited to the particular construction and arrangement of parts herein illustrated and described, but embraces all such modified forms thereof as come within the scope of the following claims.

We claim:

1. A thermoformable sheet material comprising:
   a first layer formed of amorphous PET or amorphous RPET material; and
   a second layer of a second material comprised of a PET resin having a crystallization temperature which is at least about 77° C. greater than its glass transition temperature, wherein the sheet material is thermoformed to define a first sheet part which is welded to a second sheet part to define a container.

2. The article of claim 1 wherein the second sheet part is thermoformed of a plastic material selected from the group consisting of PET, RPET, PETG, or PVC, wherein the second layer of the first sheet part is welded to the second sheet part.

3. The article of claim 1 wherein the second sheet part is thermoformed of a sheet stock having a first layer formed of PET or RPET material and a second layer of the second material, wherein the second layers of the first sheet part and the second sheet part are welded to one another.

4. The article of claim 3 wherein the second material in the second layer of the second sheet part is a PET resin having a crystallization temperature which is at least 151° C.

5. The article of claim 1 wherein the first sheet part and the second sheet part comprise a container base and lid which are joined by a flexible hinge.

6. The article of claim 1 wherein the second layer comprises about 10-40 percent by weight of a total weight of the sheet.

7. A thermoformable sheet material comprising:
   a first layer formed of amorphous PET or amorphous RPET material; and
   a second layer of a second material comprised of a PET resin having a crystallization temperature which is at least about 77° C. greater than its glass transition temperature, wherein the sheet stock is thermoformed into a first element and a second element, and the thermoformed first element and the thermoformed second element are brought together such that the second layers of the second material are in engagement with each other and are welded together to thereby seal the first element to the second element.

8. The article of claim 7 wherein the thermoformed first element and the thermoformed second element are welded to define a weld, and wherein said weld is a product of radio frequency heat sealing, ultrasonic heat sealing, bar heat sealing, or UV sealing.

* * * * *